Figure 1:
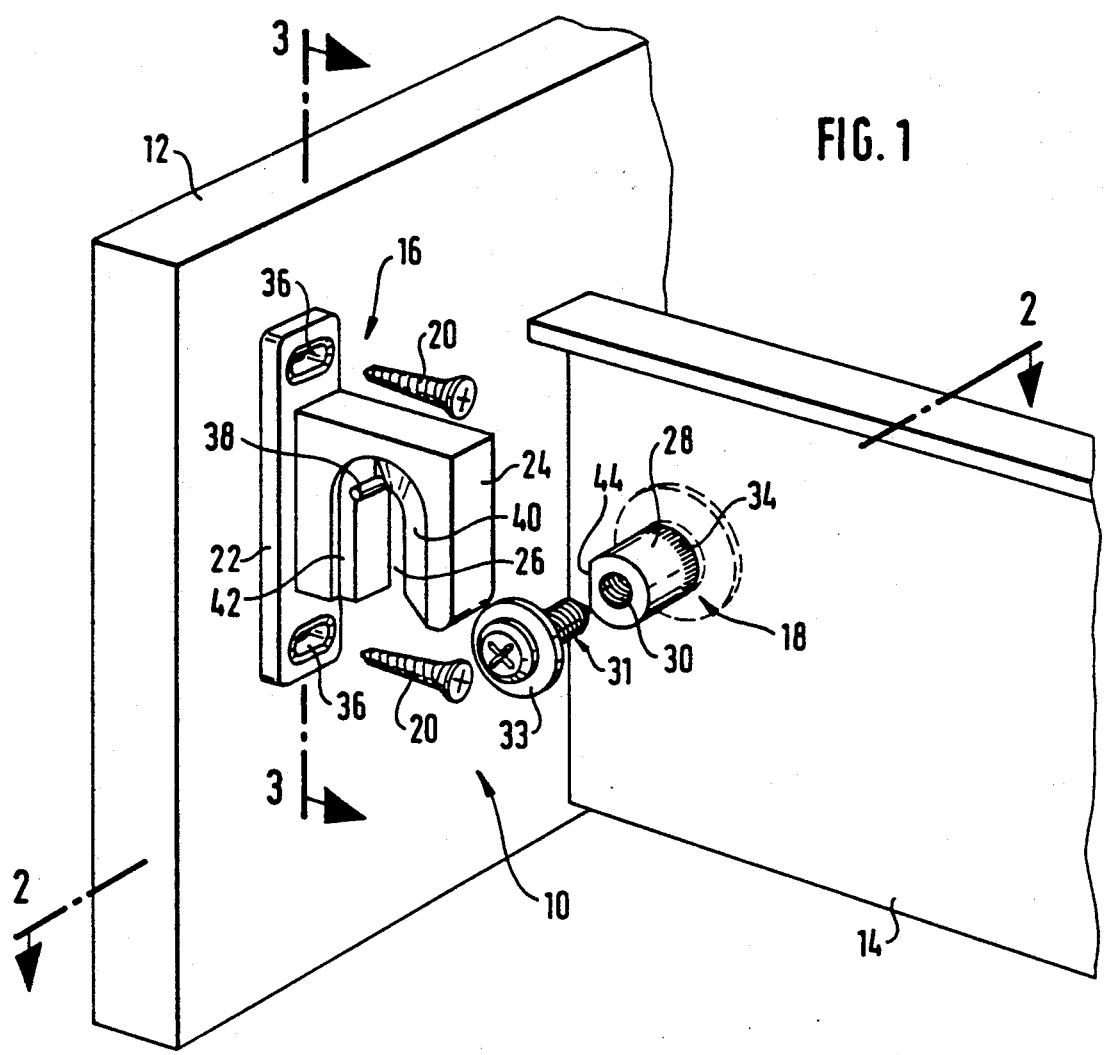

United States Patent [19]

Berger

[11] Patent Number: 5,076,723
[45] Date of Patent: Dec. 31, 1991

[54] FASTENING HARDWARE SET FOR DRAWER FRONTS

[75] Inventor: Horst Berger, Bielefeld, Fed. Rep. of Germany

[73] Assignee: Karl Lautenschläger GmbH & Co. KG, Reinheim, Fed. Rep. of Germany

[21] Appl. No.: 741,684

[22] Filed: Aug. 7, 1991

[30] Foreign Application Priority Data

Aug. 21, 1990 [DE] Fed. Rep. of Germany ....... 4026407

[51] Int. Cl.⁵ ............................................. B65D 59/00
[52] U.S. Cl. ........................................ 403/12; 403/24; 403/199; 403/245; 312/330.1; 312/263
[58] Field of Search ............... 312/348.4, 348.2, 348.1, 312/263, 330.1; 403/199, 245, 246, 407.1, 12, 24, 4

[56] References Cited

U.S. PATENT DOCUMENTS

| | | | |
|---|---|---|---|
| 4,815,796 | 3/1989 | Rock et al. | 32/263 |
| 4,815,798 | 3/1989 | Rock et al. | 312/330.1 |
| 4,881,844 | 11/1989 | Tremblay | 403/407.1 |

*Primary Examiner*—Andrew V. Kundrat

[57] ABSTRACT

The invention relates to a fastening hardware set for the adjustable fastening of a drawer front to the sides of a drawer. The invention has a hook which can be affixed to the front mark. A stud unit which can be releasably held by the hook is provided on the corresponding side.

14 Claims, 2 Drawing Sheets

FASTENING HARDWARE SET FOR DRAWER FRONTS

The invention relates to a fastening hardware set for the adjustable fastening of a drawer front to the sides of a drawer, having a hook which can be affixed to the front mask and a stud unit which can be releasably held by the hook and is provided on the corresponding drawer side.

Drawers today are mostly provided on their visible front ends with false fronts which in height and width reach beyond the actual drawer front and thus, when in the fully closed position in the corresponding cabinet carcase, they are, like full-overlap doors, in contact at the sides and, in the case of the top and bottom drawers, at their top and bottom margins, respectively, with the front edges of the cabinet carcase. The problem thus arises that the false drawer fronts have to be aligned with the fronts of drawers above them or beside them and/or with the cabinet side walls or adjacent doors such that, in the closed state, they will have an aesthetically satisfactory precise alignment. As long as the false fronts were placed on the actual drawer fronts and screwed to the latter, such alignment was relatively easy to accomplish if the bores for the screws driven from the inside of the drawer through the drawer front and into the false front were larger than the diameter of the shaft of the screws, so that, when the screws were loosened, the false front could be shifted in all directions within the range provided by the oversize of the bores. By tightening the screws after alignment was completed the false drawer fronts were then affixed to the front end of the drawer box. In recent times, however, drawers are being made without a fixed front end, i.e., the false front simultaneously constitutes the true front and therefore must be able to be fixedly joined to the drawer box in order to stabilize the front end of the drawer. On the other hand, however, the alignment described has to be possible. For this purpose various kinds of fasteners have been developed, some of which additionally serve the purpose of mounting the front end of the runner rail of the drawer guide holding the drawer on the cabinet carcase (DE-OS 36 32 442). These fastening devices are disposed underneath the drawer bottom on the inside of the drawer side where it reaches below the drawer bottom. For a sufficiently rigid fastening of the front mask to the drawer sides, however, at least in the case of drawers of great vertical depth, additional fastening means in the nature of corner fasteners must be provided above the level of the bottom, which must also permit an adjustment of the front plate, and furthermore must be as inconspicuous as possible. Consequently, in the case of drawers used in recent times for certain applications, and having sides made from hollow rolled or extruded plastic or metal, drawer-front fastening hardware disposed inside of the drawer sides has been developed (e.g., EP-OS 0 267 477) in which a stud is fastened to the drawer front and can be hung in a leaf spring which in turn is disposed adjustably in the direction of the height and of the closing movement of the drawer in a supporting part disposed inside of the hollow drawer side. For the transverse adjustment of the drawer front, the stud is furthermore itself subdivided such that these parts are adjustable transversely relative to one another. This known hardware has a relatively complex construction and accordingly is complicated and expensive to manufacture.

In addition to drawers having sides made of the above-mentioned hollow extruded shapes, some made—for cost and other reasons—of single-wall extruded aluminum shapes or from sheet steel metal shapes are being used in drawer manufacture, in which any concealed arrangement of the drawer front fastening hardware in the hollow interior is impossible.

The invention is addressed to the problem of providing fastening hardware for the fronts of drawers, which will make it possible on the one hand to fasten drawer fronts to single-wall drawer sides, namely both thin drawer sides of metal and wooden drawer sides, so as to be fixed, on the one hand, but adjustable in the necessary coordinate directions, and will at the same time have relatively small dimensions and be of simple design and thus able to be manufactured at reasonable cost.

Setting out from a hardware device of the kind described above, this problem is solved in accordance with the invention by the fact that the front-related part of the hardware set has a hooking means projecting substantially at right angles from the inside face of the drawer front and having flat sides running parallel to the drawer side, in which a slot open at one end and running vertically substantially parallel to the inside surface is provided, that the side-related part has a stud projecting from the outer surface of the drawer side and having a diameter that is slightly smaller than the width, measured horizontally, of the slot, and whose height projecting from the outer surface of the drawer side is slightly less than the thickness of the hook, and that in the end face of the stud a tap is provided into which a screw is threaded which can be driven into the stud until its head is in direct or indirect clamping engagement with the outer surface of the hook facing away from the drawer side. The drawer front is fastened to the associated drawer side, therefore, by slightly loosening the screw, placing the open end of the slot over the stud projecting from the outer surface of the associated drawer side, and pushing the stud into the slot until the desired vertical position of the drawer front with respect to the drawer box is reached. To fix the drawer front at this height, the screw is then tightened. The slot is open preferably at the bottom edge of the hook, so as to permit the drawer front to be installed by placing it on top of the stud. This will make it impossible for the drawer front to drop of its own weight from the stud after installation, which would be conceivable if the slot were instead open at the top edge.

The hook can best project from a base on which at least one opening is provided for each screw to be driven into the drawer front. These openings are best in the form of slots running horizontally, permitting the drawer front to be adjusted transversely within the range permitted by the slots.

The tightening force of the tightened screw is applied to the hook preferably through a washer of larger diameter provided on the screw and thrusting, when tightened, against the flat side of the hook facing away from the drawer side, in order thus to apply the pressure to a large area of the hook and avoid damage to the hook in the area of the slot when the screw head is rotated to tighten it.

Especially advantageous is a further development of the invention in which the back edge of the slot in the hook is provided in the area of transition to the flat side facing away from the drawer side with a sloping transitional surface acting as a tightening ramp. When the fastening screw is tightened, the margin of the washer (or the head of the screw itself) thrusts against this transitional surface, producing a wedging action between the transitional surface and the screw, which draws the hook toward the back of the drawer. The drawer front is thus drawn against the front edge surfaces of the drawer sides and stabilizes the drawer box. It is clear that this drawing of the hook requires that the stud have lateral clearance within the slot, i.e., that the slot be wider than the diameter of the stud.

The area of the flat side of the hook facing away from the drawer side and adjoining the slot, however, is configured as a contact surface parallel to the drawer side, i.e., the head of the fastening screw or the washer, as the case may be, exerts on this side of the boundary slot a force urging the hook against the drawer side.

On the flat side of the hook facing away from the drawer side a projecting abutment is advantageously provided, with which the head of the screw or the edge of the washer, as the case may be, makes contact when the hook is in a given required position relative to the stud engaged in its slot. When the drawer front is placed on the drawer box, it is therefore positively guided to the required position, and as a rule can immediately be fixed there by tightening the fastening screw.

In case it should be necessary to mount the drawer front on the drawer box in a position different from the required position, it is recommended to make the abutment removable, and, specifically, the abutment is preferably configured as a break-away pin projecting from the hook in the upper end are of the slot.

The very tight and sturdy fastening of the stud on the drawer side is preferably accomplished by passing the stud through a complementary opening in the drawer side.

At the drawer-side end of the stud, the stud then has preferably a flange of larger diameter which, when the stud is fastened in the proper position, lies against the inside face of the corresponding drawer side and secures the stud against withdrawal from the corresponding opening in the drawer side. The locking of the stud in the opposite direction, i.e., against any forcing of the stud toward the drawer interior, can be accomplished either by a correspondingly tight fit of the stud in the associated opening in the drawer side or, in the case of drawer sides made from a metal shape, by some additional fastening technique, such as welding, soldering or even upsetting.

The stud can best have a substantially circular cross section but it is provided with a flat on its side that is associated with the edge of the slot adjacent to the drawer front.

After the drawer front has been fastened in the correct position on the drawer box, a covering is then preferably placed on the hardware set. This covering can be made of thin plastic and made so as to snap onto the hardware set, since it does not have to carry any of the fastening forces.

The invention is further explained in the following description of an embodiment in conjunction with the drawing, wherein:

FIG. 1 is an exploded perspective view in which a section of a corner of the drawer front and the front portion of the corresponding drawer side are shown with their associated parts of the hardware set.

Figure 2:
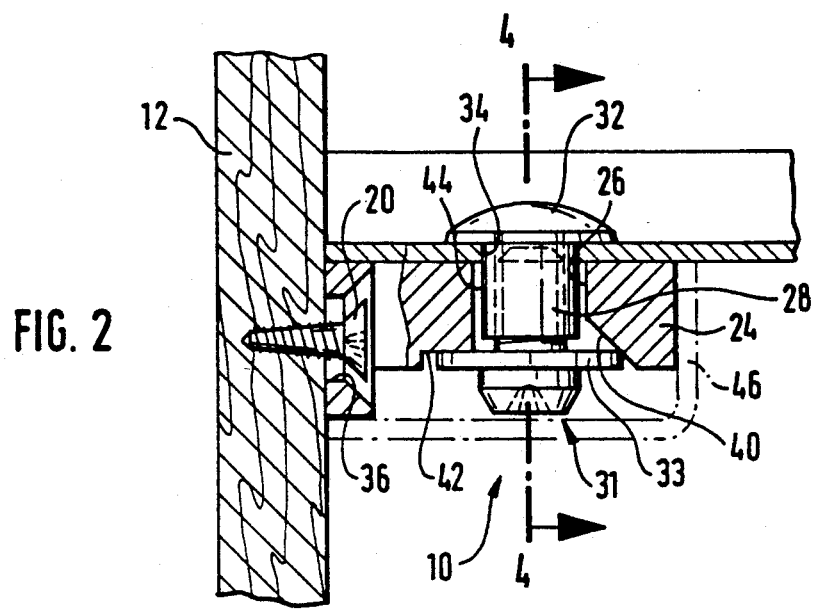
Figure 3:
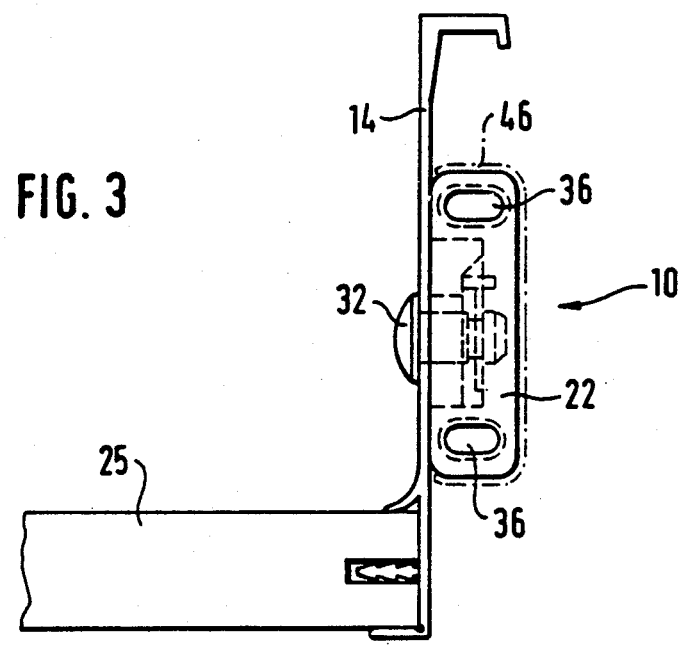
Figure 4:
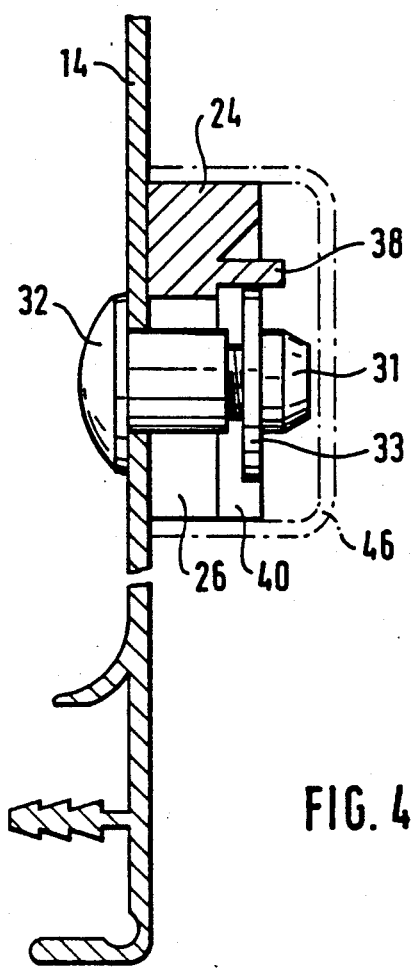

FIG. 2 is a sectional view of the installed hardware set, seen in the direction of arrows 2—2 in FIG. 1, FIG. 3 is a view of the hardware set mounted on the drawer side, seen in the direction indicated by the arrows 3—3 in FIG. 1, and FIG. 4 is a sectional view along the arrows 4—4 in FIG. 2.

In FIG. 1 there is shown an embodiment of a hardware set in accordance with the invention, indicated as a whole at 10, wherein only the corner portion of the drawer front 12 to be fastened to the drawer and only the connected portion of the drawer side 14 formed by a single-wall extruded metal shape are shown. The hardware set 10 has a hooking means 16 which can be fastened to the inside surface of the drawer front 12 and a stud unit 18 which can be fastened to the drawer side 14.

The hooking means 16 is composed of a base 22 which can be fastened with screws 20 to the inside face of the drawer front, and a hook 24 projecting approximately centrally and at right angles to the inside face. The hooking means 16 is fastened to the inside face of the drawer front such that the flat side of the hook 24 is at right angles to the inside face of the drawer front and to the drawer bottom 25 (FIG. 3). The hook 24 has a longitudinal slot 26 open at one end at the bottom edge and running parallel and at a distance from the inner surface of the drawer front, which is slipped over the shaft 28 of the stud 18 projecting from the drawer side 14. In the stud shaft 28 a tap 30 is provided in its end face, into which a screw 31 can be set, under the head of which a washer 33 is held permanently but rotatably.

The stud 18 has at its other end, i.e., the end opposite the mouth of the tap 30, an integrally formed flange 32. The stud is fastened to or in the drawer side 14 in a hole 34 through the drawer side, whose cross section corresponds to the cross section of the stud shaft 28, and the fit between the stud shaft 28 and the hole 34 is selected such that the stud shaft forced into the hole is held in the hole 34 by a press fit. It is possible additionally to fasten the stud 18 by welding or soldering the flange 32 to the drawer side 14 or also to upset the stud shaft 28 against the surrounding material of the drawer side, but as a rule this is unnecessary.

The flange 22 of the hooking means 16 has in its top and bottom ends overreaching the hook 24 the elongated holes 36 (countersunk) running horizontally, which permit the hook to be mounted in various positions horizontally on the inner face of the drawer front. When the screws 20 are loosened it is thus possible to shift the drawer front 12 relative to the hooking means 16 and thus to adjust the drawer front horizontally.

The adjustment of the drawer front at right angles perpendicular thereto is performed by locking the hook 24 at levels selected accordingly on the stud 28 whose length projecting from the drawer side 14 is made slightly less than the thickness of the hook, so that the tightening force applied through the washer 33 when the screw 31 is tightened against the outer surface of the hook 24 will result in a firm tightening of the hook 24 against the drawer side 14.

At the upper, rounded end of the slot 26 there is provided a breakaway pin 38 which is contacted by the circumferential surface of the washer 33 when the hook is hung on the stud 28 and then holds the hook preinstalled at a given level relative to the stud. If an adjustment of the drawer front 12 in the downward direction is necessary, the pin 38, weakened by a notch at its transition to the hook 24, can be broken off, so that the hook can then be pushed further downwardly over the stud 28 and, when the desired setting of the drawer front is reached, can be fixed in place by tightening the screw 31.

To bring it about so that, when the screw 31 is tightened against the hook 24, a pull will be exerted drawing the drawer front into tight engagement with the associated end of the drawer side 14, the edge of the slot 26 remote from the drawer front is provided in the area of transition to the flat side of the hook with a sloping transition surface 40 acting as a tightening ramp, against which the outer margin of the washer 33 thrusts. It is now clear that, when the screw is tightened, the washer is simultaneously forced downwardly and seeks to slide down on the sloping surface 40. This provides the desired pull on the hook. This kind of transition surface is not provided on the area of the flat side of the hook that faces away from the drawer side and adjoins the slot of the hook on the drawer front side; instead, this area is configured as a contact surface 42 parallel to the drawer side, on which the bottom of the washer 33 facing the drawer side broadly rests and transfers the pressure of the screw broadly to the hook.

In can be seen especially in FIG. 2 that the slot 26 has in the horizontal direction a slightly greater width than the diameter of the stud shaft 28 measured in this direction. This is brought about, in the case of the depicted example, by the fact that the basically circular cross-sectional shape of the stud shaft 28, with a diameter corresponding to the width of the slot, is provided with a planar flattening 44 on the side associated with the slot boundary on the drawer front side. The material removed from the stud shaft 28 in the formation of this flattening 44 has the consequence that the necessary free play of the stud shaft 28 in the horizontal direction within the slot 26 is obtained.

It can then also be seen in FIGS. 2 to 4 that the hardware set 10, after a correct alignment and fastening of the drawer front 12 to the side of the drawer, is covered with a cap 46, represented in broken lines in the above-mentioned figures. This cap 46 does not of itself serve any fastening purposes, but serves only to conceal the hardware set. It can therefore easily be made inexpensively from plastic, and it can be fastened by snapping it on the flange 22 of the hook 16.

I claim:

1. Hardware set for the adjustable fastening of the front of a drawer to its sides, with a hook attachable to the drawer front and a stud releasably attachable to the hook, provided on the corresponding drawer side, characterized in that the hooking means (16) has a hook (24) projecting from the inside surface of the drawer front (12) and having flat sides running parallel to the drawer side, in which a longitudinal slot (26) running vertically substantially parallel to the inside surface and open at one end, that the stud unit (18) has a stud (28) projecting from the outer surface of the drawer side (14), whose diameter is slightly smaller than the width, measured horizontally, of the longitudinal slot (26), and its height projecting above the outside surface of the drawer side (14) is slightly smaller than the thickness of the hook (24), and that in the end face of the stud (28) a tap (30) is provided into which the shaft of a screw (31) is driven, which can be driven into the stud (28) until the direct or indirect clamping engagement of its head with the outer surface, facing away from the drawer side, of the hook (24).

2. Hardware set according to claim 1, characterized in that the longitudinal slot (26) opens in the bottom defining edge of the hook (24).

3. Hardware set according to claim 1 or 2, characterized in that the hook (24) projects from a mounting flange (22) in which at least one opening is provided for a screw (20) which can be driven into the drawer front.

4. Hardware set according to claim 3, characterized in that the openings have the form of an elongated hole (36) running horizontally.

5. Hardware set according to claim 1, characterized in that the screw (31) drivable into the tap (30) is provided with a washer (33) enlarged in diameter and, when tightened on the flat side facing away from the drawer side, thrusting on the flat side of the hook (24) facing away from the fastening side.

6. Hardware set according to claim 1, characterized in that the boundary facing away from the drawer front of the longitudinal slot (26) in the hook (24) is provided in the area of transition to the flat side facing away from the drawer side, with a sloping transition surface (40) acting as a drawing ramp.

7. Hardware set according to claim 1, characterized in that the area of the flat side of the hook (24) facing away from the drawer side and adjoining the longitudinal slot (26) of the hook on the drawer front side is configured as a bearing surface (42) parallel to the drawer side.

8. Hardware set according to claim 2, characterized in that, on the flat side of the hook (24) facing away from the drawer side, a projecting abutment is provided, against which the head of the screw (31) or the edge of the washer (33), as the case may be, abuts in a given vertical correct positioning of the hook (24) relative to the stud (28) engaging in its longitudinal slot (26).

9. Hardware set according to claim 8, characterized in that the abutment is removable.

10. Hardware set according to claim 9, characterized in that the abutment is a break-away pin (38) projecting from the hook (24) in the upper end part of the longitudinal slot (26).

11. Hardware set according to claim 1, characterized in that the stud (28) passes through a complementary opening (34) in the drawer side (14).

12. Hardware set according to claim 11, characterized in that the stud (28) has a flange (32) of enlarged diameter provided on the drawer-side end of the stud shaft (28).

13. Hardware set according to claim 1, characterized in that the stud (28) has a substantially circular cross section which, however, is provided, on its side associated with the boundary of the longitudinal slot (26) adjacent the drawer front, with a planar flattening (44).

14. Hardware set according to claim 1, characterized by a covering cap (46) which overreaches the hardware set (10) and can be installed after the hook part and the stud part (16; 18) have been fastened together.

* * * * *